US008448603B2

(12) United States Patent
Northrop et al.

(10) Patent No.: US 8,448,603 B2
(45) Date of Patent: May 28, 2013

(54) ANIMAL BOWL WITH SPILL-RESISTANT RIM

(75) Inventors: Melaney Northrop, Mansfield, TX (US); Michael D. Harper, Fort Worth, TX (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 312 days.

(21) Appl. No.: 13/082,297

(22) Filed: Apr. 7, 2011

(65) Prior Publication Data

US 2011/0247565 A1 Oct. 13, 2011

Related U.S. Application Data

(60) Provisional application No. 61/321,638, filed on Apr. 7, 2010.

(51) Int. Cl.
*A01K 7/00* (2006.01)
*A01K 5/00* (2006.01)

(52) U.S. Cl.
USPC ................... 119/61.54; 119/61.55

(58) Field of Classification Search
USPC ............... 119/61.54, 61.5, 61.53, 61.55, 72, 119/74, 75, 76, 77, 78, 51.5
See application file for complete search history.

(56) References Cited

U.S. PATENT DOCUMENTS

| | | | | |
|---|---|---|---|---|
| 4,436,056 A | * | 3/1984 | MacLeod | 119/72 |
| 4,573,434 A | * | 3/1986 | Gardner | 119/77 |
| D296,371 S | * | 6/1988 | Lorenzana et al. | D30/122 |
| 5,031,575 A | | 7/1991 | Phillips | |
| 5,207,182 A | * | 5/1993 | Lorenzana | 119/77 |
| 5,488,927 A | * | 2/1996 | Lorenzana et al. | 119/51.5 |
| 5,730,082 A | * | 3/1998 | Newman | 119/51.5 |
| 5,738,038 A | * | 4/1998 | Barton | 119/73 |
| 5,758,599 A | * | 6/1998 | Glanville | 119/77 |
| 5,881,670 A | | 3/1999 | Pelsor | |
| 6,119,628 A | * | 9/2000 | Lorenzana et al. | 119/77 |
| 6,142,101 A | * | 11/2000 | Pelsor | 119/61.54 |
| 6,427,626 B1 | | 8/2002 | Quinlan | |
| 6,467,428 B1 | * | 10/2002 | Andrisin et al. | 119/51.5 |
| 6,739,284 B1 | * | 5/2004 | Olive | 119/74 |
| 6,863,025 B2 | * | 3/2005 | Ness | 119/72 |
| 6,928,954 B2 | * | 8/2005 | Krishnamurthy | 119/51.5 |
| 6,971,331 B1 | * | 12/2005 | Rohrer | 119/77 |
| 7,040,249 B1 | * | 5/2006 | Mushen | 119/51.5 |
| 7,146,930 B1 | * | 12/2006 | Ness | 119/77 |
| 7,284,499 B1 | * | 10/2007 | Kuster | 119/51.5 |
| 7,296,539 B2 | * | 11/2007 | Iljas | 119/61.54 |
| 7,987,817 B2 | * | 8/2011 | Johnson | 119/74 |
| 8,186,304 B2 | * | 5/2012 | Harper | 119/74 |
| 8,272,351 B2 | * | 9/2012 | Hurwitz | 119/74 |
| 8,291,862 B2 | * | 10/2012 | Gauker et al. | 119/72 |
| 8,333,168 B2 | * | 12/2012 | Vaughn et al. | 119/72 |
| 8,381,685 B2 | * | 2/2013 | Lipscomb et al. | 119/74 |
| 8,387,566 B2 | * | 3/2013 | Graves et al. | 119/72 |
| 2008/0257272 A1 | * | 10/2008 | Bolda | 119/72 |
| 2010/0050950 A1 | | 3/2010 | Graves et al. | |
| 2010/0300366 A1 | | 12/2010 | Lipscomb et al. | |

* cited by examiner

*Primary Examiner* — Yvonne Abbott
(74) *Attorney, Agent, or Firm* — Eckert Seamans Cherin & Mellott, LLC; Brij K. Agarwal

(57) ABSTRACT

Pet waterers and feeders are provided that have a spill-resistant rim. In particular, in one embodiment, a device for dispensing at least one of food and liquid to an animal is provided. The device includes a bowl and a coupler positioned over a first opening of the bowl. The coupler is configured to receive a bottle. Additionally, the device includes a spill-resistant rim positioned over a second opening of the bowl. The spill-resistant rim extends inwardly into the second opening to prevent spilling of the bowl's contents.

20 Claims, 3 Drawing Sheets

ANIMAL BOWL WITH SPILL-RESISTANT RIM

CROSS-REFERENCE TO RELATED APPLICATIONS

This application is related to and claims priority to U.S. Provisional Patent Application Ser. No. 61/321,638, entitled "Animal Bowl with Spill-Resistant Rim," filed Apr. 7, 2010, which is incorporated herein by reference in its entirety and for all purposes.

TECHNICAL FIELD

Embodiments discussed herein relate generally to bowls for feeding and/or watering an animal, and more particularly to an animal bowl having a rim for reducing spills.

BACKGROUND

Domesticated animals are often fed and watered from bowls or other containers. In many cases, dispensers are attached to such bowls to provide a ready source of food and/or water. These bowls may be automated or gravity-fed. An automated dispenser releases a certain amount of food and/or water at a certain time, or when the food/water level drops below a certain point, and are typically mechanically and/or electronically actuated. A gravity-fed dispenser, by contrast, relies on the force of gravity to move food from the dispenser to the bowl.

In either case, the bowl is often full of food and/or water that may be spilled over its rim by bumping or knocking the bowl or the feeder. Indeed, as the feeder empties, there is less mass within the feeder to resist unwanted motion, and so accidental impacts may move the feeder and attached bowl more than if the feeder were full. This, in turn, may cause the contents of the bowl to spill over the rim. For example, in the case of a water dispenser, if bumped, a reservoir may release more water into the bowl area and the water level of the bowl may become almost level with the top of the bowl. Thus, a spill is likely to occur when a pet drinks from the bowl or if the device is accidentally bumped again.

Additionally, many dogs push food around with their nose and possibly over the edges of conventional bowls as they eat. In the case of a gravity feeder, if the dog were to continue to push food out of the bowl, the contents of the food storage reservoir located above the feeding bowl may be emptied, thus wasting food.

SUMMARY

Pet waterers and feeders are provided that have a spill-resistant rim. In particular, one embodiment may take the form of a device for dispensing at least one of food and liquid to an animal is provided. The device includes a bowl and a coupler positioned over a first opening of the bowl. The coupler is configured to receive a bottle. Additionally, the device includes a spill-resistant rim positioned over a second opening of the bowl. The spill-resistant rim extends inwardly into the second opening to prevent spilling of the bowl's contents.

Additionally, the spill-resistant rim provides increased interface with the base. If the feeder was designed without a non-spill rim, the coupler would NOT have the opportunity to snap onto the entire perimeter of the bowl—in fact limiting the contact of the snap in feature to only those areas of the bowl behind the feeder chute. By adding the non-spill rim feature, the design allows for the attachment feature to extend the entire perimeter of the bowl, increasing the bond between bowl and coupler by at least 70% (e.g, 70% more bowl perimeter is now engage than without the non-spill rim).

Another embodiment may take the form of a pet feeder/waterer having a lower portion configured to contain at least one of food and liquid for animal consumption and an upper portion. The upper portion includes a coupler for receiving a bottle and a spill-resistant rim extending outwardly from the coupler to form a semi-circular shape. The spill-resistant rim extends inwardly from a sidewall of the bowl to prevent spilling of the food and liquid.

Yet another embodiment may take the form of an integrally formed upper portion of a bowl assembly for use as a pet feeder. The upper portion includes a coupler configured to receive a retaining bottle and a spill-resistant rim extending outwardly from the coupler in a semi-circular shape. The spill-resistant rim includes a continuous lip extending inwardly into the semi-circular shape, a downwardly extending segment configured to retain an upper edge of a bowl, and an insert wall extending downwardly from the spill-resistant rim. The insert wall includes an engagement member protruding outwardly from the insert wall toward the downwardly extending segment and an aperture for receiving an engagement member of the bowl. The engagement members of the insert wall and the bowl are configured to engage each other.

While multiple embodiments are disclosed, still other embodiments of the present invention will become apparent to those skilled in the art from the following Detailed Description. As will be realized, the embodiments are capable of modifications in various aspects, all without departing from the spirit and scope of the embodiments. Accordingly, the drawings and detailed description are to be regarded as illustrative in nature and not restrictive.

DETAILED DESCRIPTION

Embodiments discussed herein take the form of a bowl having a spill-resistant rim for animal food and/or water. The spill-resistant rim may generally extend inwardly into an opening of a bowl so as to prevent splashing or spilling of the bowl's contents when moved. For example, in the case of a dog pushing food with its nose while eating, the spill-resistant rim will cause the food to fall back into the bowl. Although in some embodiments the bowl may be used with food and/or liquid, the bowl will be discussed herein in terms of retaining liquid, specifically water. It should be understood that other liquids and foodstuffs may be used with the embodiments discussed herein.

Beyond helping to resist the undesirable spilling of food and liquid, the spill-resistant rim 104 also creates a more pleasing appearance of the bowl 102, hiding any raw, unfinished edges of the bowl. In order to achieve the same pleasing appearance (from above bowl), the edge of the bowl would need to be significantly thickened, causing poor injection molding practices and lengthening the time required to injection mold the part.

Figure 1:
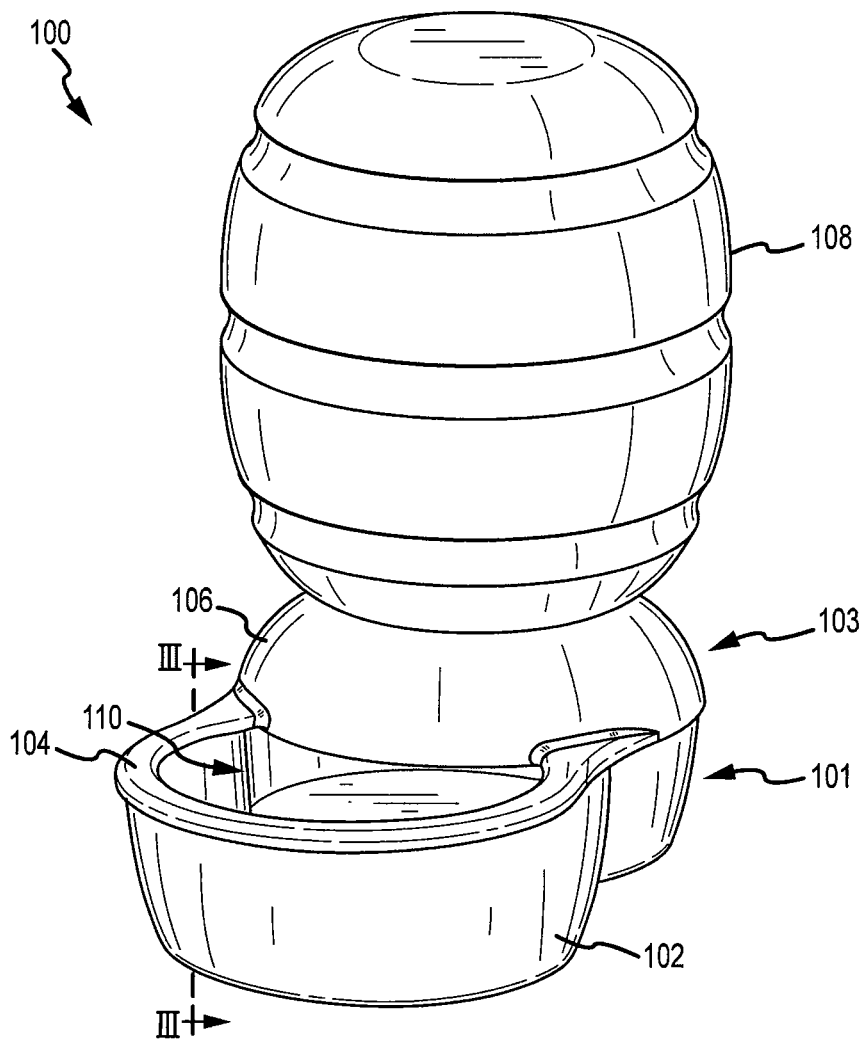
FIG. 1 depicts an animal feeder having a bowl with a spill-resistant rim.

FIG. 1 depicts a sample embodiment of an animal feeder 100 that includes a bowl 102 with a spill-resistant rim 104. Generally, the bowl 102 may take any suitable shape, such as a circle, an oval, a square and so forth. As illustrated, the bowl 102 has a figure "8" shape (e.g., two adjoined circles).

The bowl 102 may include a lower portion 101 and an upper portion 103. The lower portion 101 may generally include what traditionally may be considered the bowl. That is, the lower portion 101 has a base with sidewalls extending upwardly therefrom so that it may hold food and/or liquid.

The upper portion 103 of the bowl 102 may join with and be positioned on top of the sidewalls of the lower portion 101. In some embodiments, the upper portion 103 of the bowl 102 includes a coupler 106. The coupler 106 may be positioned over a portion of the bowl and configured to receive a retaining bottle 108. When viewed from the top, the bowl 102 and coupler 106 resemble two intersecting circles in outline. More specifically, the coupler 106 is generally circular while an opening 110 of the bowl 102 has a semicircular shape. The rim 104 of the bowl 102 may at least partially define the shape of the opening 110 and may generally have the same shape as the bowl 102. In some embodiments, the opening 110 may be defined by the rim 104 and a portion of the coupler 106. In particular, the rim 104 may be coupled with or integrally formed with the coupler 106 and extend outwardly from a point of intersection to form a semicircle. A portion of the coupler closes the semicircle. Thus, when viewed from the above, the opening 110 of the bowl 102 resemble the letter "D" if the straight portion of the "D" curved towards the rest of the letter.

The sidewalls of the bowl 102 may be continuous about an outer perimeter of the feeder 100. There is generally no partition or sidewall internal to the bowl 102 so that there is liquid communication to permit liquid (or food) to flow from the retaining bottle, through the coupler 110, and ultimately into the bowl 102. In some embodiments, support structures may be located within the bowl 102 to provide structural support to the bowl. Gravity moves liquid from the bottle 108 into the bowl 102.

Figure 2:
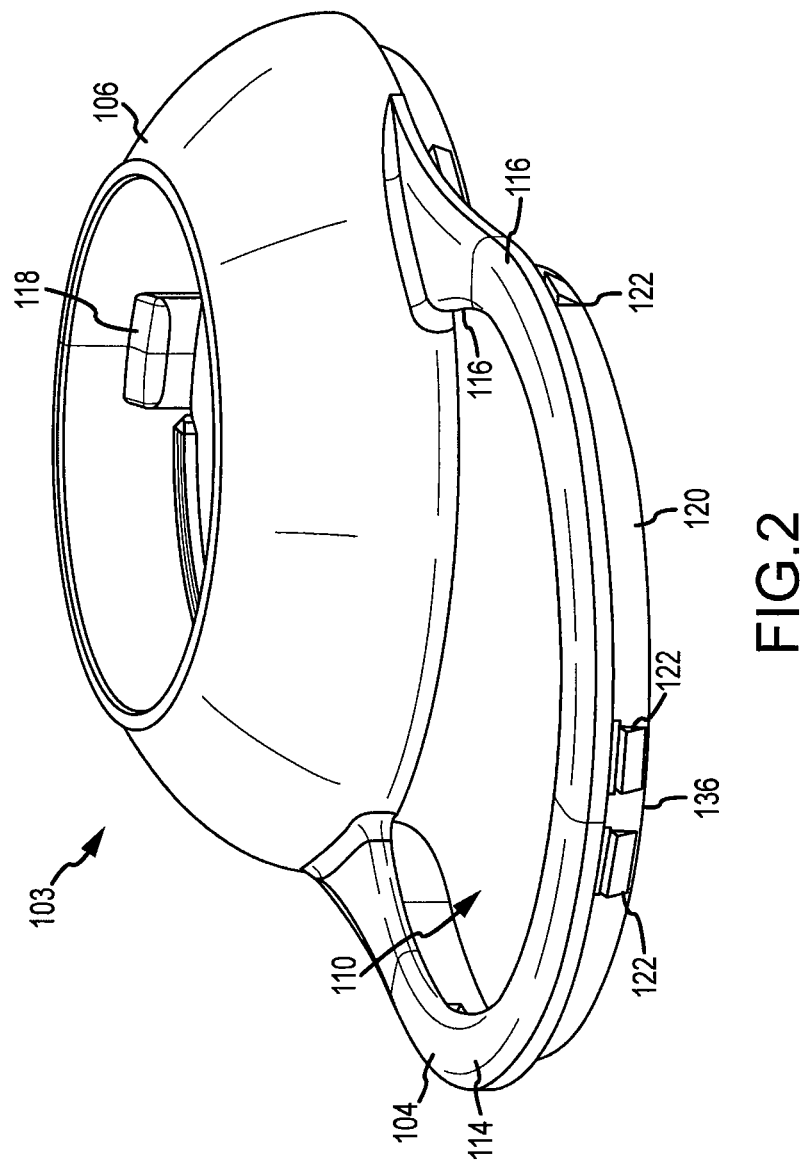
FIG. 2 depicts a top portion of the animal feeder of FIG. 1.

As may be appreciated, the bowl 102 and coupler 110 may be created as an integral unit in some embodiments. In other embodiments, the bowl and coupler may be formed as separate parts. FIG. 2 depicts the top portion 103 that may be created separately from the bowl 102, but is configured to be used with the bowl. The top portion 103 is molded as a single piece in the present embodiment, although in alternative embodiments the top portion may be made from multiple pieces. Generally, and as shown in FIG. 2, the top portion 103 includes the coupler 106 and the rim 104 that extends outwardly from the coupler to form a semicircle.

The coupler 106 may take the form of a circular receptacle for the retaining bottle 108. Specifically, a retaining bottle 108 may be inverted with an opening inserted into the circular receptacle. Liquid may flow from the retaining bottle 108 through the circular receptacle, through the base of the coupler 106 and into the bowl 102. Additionally, the coupler 106 may be configured with a coupling member 118 that engages the retaining bottle 108. The coupling member 118 may take any suitable form, such as a lip that engages the retaining bottle when the bottle is rotated within the receptacle, to lock the bottle in place relative to the top portion 103.

The rim 104 may have a flattened top surface 114 with rounded corners 116. Generally, the flattened top surface 114 may have a uniform width around the semicircular shape with a portion adjacent to the coupler 106 tapering wider at the interface of the rim 104 and the coupler 106. In some embodiments, the front edge of the coupler 106 may take a shape similar to that of the rim to help prevent spilling of the bowls contents.

An insert wall 120 extends from the bottom of the rim 104 and is configured to fit within the bowl 102. The insert wall 120 may include a number of engagement members 122 that are configured to secure the top portion 103 with the bowl 102. The engagement members 122 may take any suitable form and, in particular, may take the form of angled snaps. The angled snaps are configured such that once engaged, they may not easily or accidentally be disengaged. The engagement members 122 may be distributed about the perimeter of the insert wall 120. In some embodiments, the engagement members 122 may be paired together at certain positions, such as near the front of the rim 104 and near the rear of the coupler 106. It should be appreciated that the bowl 102 is configured with corresponding engagement features to allow for securing the top portion 103 to the bowl. In some embodiments, the bowl 102 may include engagement members and the insert wall 120 may be provided with slots for receiving the engagement snaps. In still other embodiments, both the bowl 102 and the insert wall 120 may include engagement members and engagement features (e.g., each includes both engagement snaps and slots).

Additionally, the spill-resistant rim 104 provides increased interface with the bowl 104. That is, in a feeder without a non-spill rim, the coupler 106 would not have the opportunity to snap onto the entire perimeter of the bowl 102, thereby limiting the contact of engagement members to only those areas of the bowl behind the feeder chute. By adding the spill-resistant rim 104, the attachment feature may extend the entire perimeter of the bowl 102, thus increasing the bond between bowl and coupler by at least 70% (e.g, 70% more bowl perimeter is now engage than without the non-spill rim).

The rim 104 extends generally inwardly from the sidewalls of the bowl (that is, the rim extends inward along the outer curved portion of the D-shaped opening). In some embodiments, a rim may extend inwardly from the front edge of the coupler 106 as well.

Figure 3:
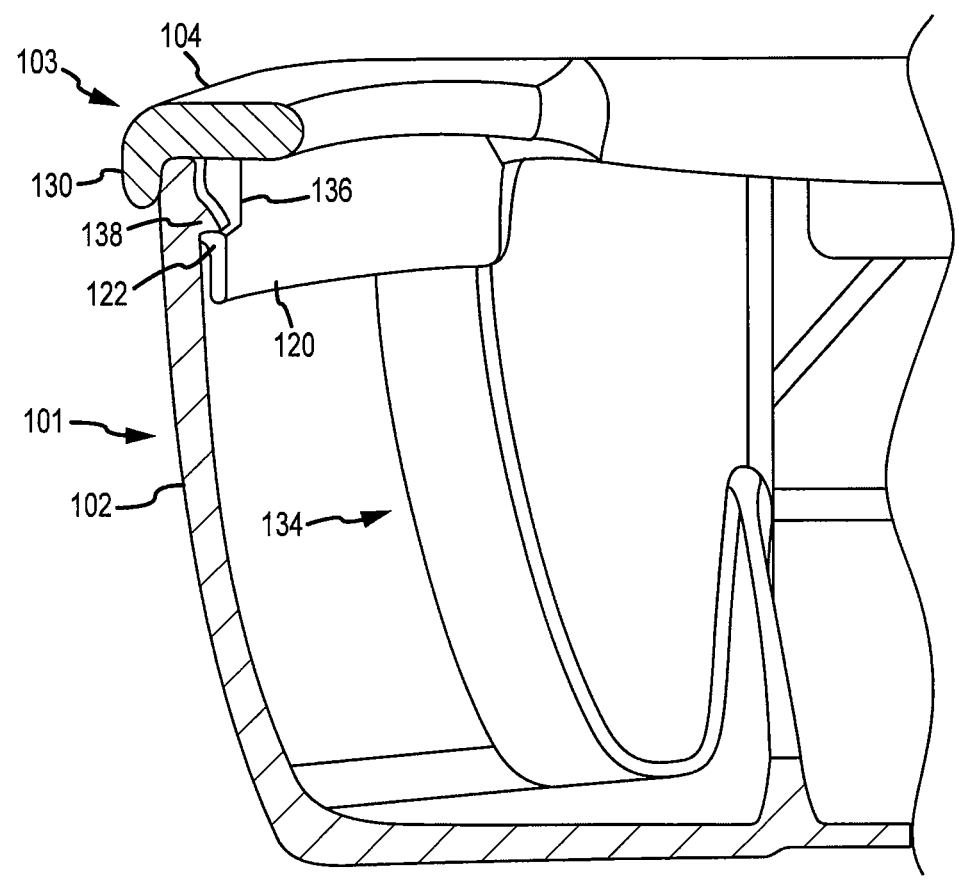
FIG. 3 is a cross-sectional view of a portion of the bowl of FIG. 1, showing the spill-resistant rim in cross-section.

FIG. 3 is a partial cross-section of a portion of the animal bowl taken along line III-III in FIG. 1 showing both the top and bottom portions 101, 103 thereof and likewise showing the inwardly-extending rim 104. As can be seen in FIG. 3, the rim 104 is generally T-shaped in cross-section, with the outermost segment of the T-shape having a downwardly-extending segment 130. This downwardly-extending segment 130 may be used, for example, to retain an upper edge 132 of the lower portion 101 of the bowl 102, thereby joining the top and bottom bowl portions 103, 101.

Generally, the inwardly-projecting rim 104 may help prevent liquid from exiting the bowl 102. As the feeder and/or retaining bottle 108 is jostled, liquid in the bowl 102 may be forced against the interior sidewalls 134 of the bowl 102 and upwardly directed. In many cases, this liquid may impact the rim 104 and be downwardly, inwardly or otherwise diverted, thereby preventing the liquid from spilling out of the bowl 102.

As shown in FIG. 3, the top and bottom portions 101, 103 of the bowl and feeder mechanism may be joined together. In particular, and as depicted in both FIGS. 2 and 3, one or more apertures 136 may be formed in the insert wall(s) 120 of the top portion 103, beneath the rim 104. A ramp-shaped projection ("snap") 122 may be formed beneath each such opening 136. The snap 122 generally has a level top surface and an angled bottom surface.

An opposing snap 138 is formed on the inner sidewall 134 of the bottom portion 101. This opposing snap 138 faces inward and has a generally flat bottom surface and angled top surface. The opposing snap 138 may be fitted into the aperture 136 formed in the top portion 103 such that it projects therethrough. When the opposing snap 138 is in this position, an upper edge of the bottom surface is received between the inner and outer sidewalls of the top portion 103. That is, the inner and outer sidewalls of the top portion 103 form a shape similar to an upside-down "U" into which the upper edge of the bottom surface fits.

The opposing snap 138 is thus held in place through friction generated between the top and bottom portions 103, 101 of the bowl 101, as well as pressure exerted on the sidewall of the bottom portion 101 by the combination of the top portion's inner and outer sidewalls. Further, the aperture 136 is generally sized to snugly receive the opposing snap 138. All of this, in combination, minimizes or reduces movement between the upper and lower portions 103, 101 of the bowl 102. (In alternative embodiments, the apertures may be formed in the bottom portion and the opposing snaps in the top portion.)

It should be noted that multiple apertures 136 with mating opposing snaps 138 may be employed. Such configurations may be spaced along the edge of the bowl in order to resist decoupling forces applied in a variety of vectors along the bowl 102 or its edge. By employing multiple apertures and opposing snaps, the integrity of the bowl 102 may be strengthened and the bowl may be made more resistant to turning and/or twisting forces, since such forces will generally be opposed by at least one joinder between the top and bottom bowl portions.

Likewise and with respect to FIG. 2, the conjoined circular shape of the bowl 102 and top portion 103 permits the top portion to be manufactured as a single piece. Accordingly, the inwardly-projecting rim 104 is connected to the circular receptacle for the bottle 108 to provide a shape similar to a basketball hoop protruding from a backboard. This likewise may provide additional strength and stability to the bowl and inwardly-projecting rim 104 in particular, insofar as the mass of the feeder and retaining bowl are securely connected to the rim. In alternative embodiment, the top portion of the bowl (e.g., the rim 104) and the top portion of the feeder (e.g., the coupler 106) may be separate pieces, separately molded, and so on.

The top and bottom portions of the bowl and feeder may be formed from any suitable material, including plastic, metal, composites, and so on, and through any suitable process, such as a suitable molding process. Generally, the material used to form the bowl and feeder portions should resist minor impacts and provide a degree of rigidity to the bowl.

Although embodiments have been described herein with particularity, it should be understood by those skilled in the art that variants, changes and adjustments may be made to such embodiments without departing from the spirit or scope of the invention.

We claim:

1. A device for dispensing at least one of food and liquid to an animal, the device comprising:
    a bowl;
    a coupler positioned over a first opening of the bowl and configured to receive a bottle; and
    a spill-resistant rim positioned over a second opening of the bowl, the spill-resistant rim extending inwardly into the second opening to prevent spilling of the bowl's contents.

2. The device of claim 1, wherein the coupler and the spill-resistant rim are molded together and form an upper portion.

3. The device of claim 1, wherein the spill-resistant rim comprises an downwardly extending wall that interfaces an interior surface of the bowl.

4. The device of claim 3, wherein the downwardly extending wall comprises an aperture for receiving an engagement member of the interior surface of the bowl.

5. The device of claim 4, wherein the downwardly extending wall comprises an engagement member configured to interlock with the engagement member of the interior surface of the bowl.

6. The device of claim 5, wherein the engagement member of the downwardly extending wall comprises a substantially flat top surface and an angled lower surface.

7. The device of claim 1, wherein the spill-resistant rim comprises a downwardly extending segment configured to retain an upper edge of the bowl.

8. The device of claim 1, wherein the spill-resistant rim has a generally T-shape.

9. The device of claim 1, wherein the spill-resistant rim has a semi-circular shape.

10. The device of claim 9, wherein a segment of the coupler extends into a circumference of the semi-circular shape of the spill-resistant rim.

11. The device of claim 10, wherein the segment of the coupler has a shape substantially similar to that of the spill-resistant rim.

12. The device of claim 1 further comprising a bottle positioned within the coupler.

13. The device of claim 12, wherein the coupler comprises an engagement member for securing the bottle in place.

14. The device of claim 1, wherein the bowl has a figure 8 shape.

15. The device of claim 1, wherein the spill-resistant rim, coupler and bowl are made of the same material.

16. The device of claim 1, wherein the spill-resistant rim comprises a substantially flat top surface and rounded edges.

17. A pet feeder/waterer comprising:
    bowl comprising:
        a lower portion configured to contain at least one of food and liquid for animal consumption; and
        an upper portion comprising:
            a coupler for receiving a bottle; and
            a spill-resistant rim extending outwardly from the coupler to form a semi-circular shape, wherein the spill-resistant rim extends inwardly from a sidewall of the bowl to prevent spilling of the food and liquid.

18. The pet feeder/waterer of claim 17, wherein the spill-resistant rim comprises a plurality of engagement members for securing the spill-resistant rim with the bowl.

19. The pet-feeder/waterer of claim 18, wherein the spill-resistant rim comprises a downwardly extending segment configured to retain an upper edge of the bowl.

20. An integrally formed upper portion of a bowl assembly for use as a pet feeder, the upper portion comprising:
    a coupler configured to receive a retaining bottle; and
    a spill-resistant rim extending outwardly from the coupler in a semi-circular shape, the spill-resistant rim comprising:
        a continuous lip extending inwardly into the semi-circular shape;
        a downwardly extending segment configured to retain an upper edge of a bowl; and
        an insert wall extending downwardly from the spill-resistant rim, the insert wall comprising:

an engagement member protruding outwardly from the insert wall toward the downwardly extending segment; and an aperture for receiving an engagement member of the bowl, wherein the engagement members of the insert wall and the bowl are configured to engage each other.

\* \* \* \* \*